Patented Dec. 9, 1924.

1,519,007

UNITED STATES PATENT OFFICE.

JOHN HAMILTON PATERSON, OF WESTMINSTER, LONDON, ENGLAND, ASSIGNOR TO THE PREMIER ELECTRIC WELDING COMPANY, LIMITED, OF LONDON, ENGLAND, A BRITISH COMPANY.

WELDING BY THE ELECTRIC ARC.

No Drawing. Application filed November 27, 1922. Serial No. 602,716.

*To all whom it may concern:*

Be it known that I, JOHN HAMILTON PATERSON, a subject of the King of Great Britain, residing at Bank Buildings, St. James' Street, city of Westminster, in the county of London, England, have invented certain new and useful Improvements in or Relating to Welding by the Electric Arc, of which the following is a specification.

This invention relates to the welding of iron and steel by the electric arc, and has for its chief object to improve the metal of the weld by providing the electrode with a coating or charge producing during the welding operation a reducing atmosphere around the arc and over the heated metal. This atmosphere, which is usually a mixture of carbon monoxide and dioxide, protects the weld from the action of atmospheric air.

According to this invention the coating of the rod of iron or iron alloy comprises a carbonate of a heavy metal the oxides of which, that is, such as are liable to be formed by decomposition of the carbonate, have a comparatively low melting point, such as iron, nickel or manganous carbonate, together with a proportion of carbon, or carbonaceous material such as ground coke or anthracite. By carbonate of a heavy metal a mixture of such carbonates is also to be understood. The carbonates of the heavy metals are employed so that the fusible oxides produced on decomposition form a slag which rises to the surface of the molten metal and does not remain enmeshed in the finished weld. By heavy metal is meant a common metal of fairly high specific gravity, from about 7 upwards, water being taken as 1. The mixture may be made into a paste with a suitable binding agent and coated upon the electrode or applied in any other convenient manner which allows it to be subjected to the heat of the arc during welding. A suitable mixture which may be given as an example consists of chalk 2 parts, ferrous carbonate 6 parts, and lamp black 8 parts, by weight. The ferrous carbonate may be replaced by equal parts of nickel or manganous carbonate. Another suitable mixture consists of ferrous carbonate, 6 parts, manganous carbonate, 2 parts, and lamp black, 8 parts, chalk being dispensed with.

It is desirable in the case of coatings containing a large proportion of carbon to cover the coating with a thin outer layer of non-combustible material which prevents the coating from burning before the arc reaches it and also prevents the coating breaking off during use. The outer covering may comprise a mixture of precipitated chalk with a suitable binding agent such as glue or silicate of soda, and it may be coloured if required with any suitable distinguishing colouring material. It may also contain a suitable reducing agent, such as dextrine, when the main coating includes easily oxidizable material, such as manganous or ferrous carbonate.

A number of carbonates of the heavy metals have been found suitable for the purpose of this invention either as simple carbonates or mixtures of the carbonates and the following may be given as a list of the common heavy metals which have been employed and have been found suitable:—iron, copper, lead, tin, manganese and nickel. Other metals coming within the definition given may, however, be employed.

What I claim and desire to secure by Letters Patent of the United States is:—

1. An electrode for welding iron or steel by the electric arc, comprising a metal rod and a coating comprising a large proportion of the carbonate of a heavy metal the oxides of which are readily fusible, and a carbonaceous reducing material.

2. An electrode for welding iron or steel by the electric arc, comprising a metal rod and a coating comprising a large proportion of the carbonate of a heavy metal the oxides of which are readily fusible and carbon in finely divided form.

3. An electrode for welding iron or steel by the electric arc, comprising a metal rod and a coating comprising a large proportion of the carbonate of a heavy metal the oxides of which are readily fusible, and a carbonaceous reducing material, the carbonate and reducing material being in approximately equal proportions.

4. An electrode of welding iron or steel by the electric arc, comprising a metal rod and a coating comprising a large proportion of ferrous carbonate and a carbonaceous reducing material.

5. An electrode for welding iron or steel by the electric arc, comprising a metal rod and a coating comprising a large proportion of ferrous carbonate, manganous carbonate and a carbonaceous reducing material.

6. An electrode for welding iron or steel by the electric arc, comprising a metal rod and a coating comprising a large proportion of ferrous carbonate, manganous carbonate and lamp black.

7. In an electrode as in claim 1, an outer covering of non-combustible material upon the aforesaid coating.

8. In an electrode as in claim 1, an outer covering for the aforesaid coating, of non-combustible material containing a reducing agent.

JOHN HAMILTON PATERSON.